2,892,871

PROCESS FOR OBTAINING SEC-N-ARYL-BETA-HALOALKYLAMINES

Allen H. Filbey, Royal Oak, and Lloyd R. Buzbee, Berkley, Mich., assignors to Ethyl Corporation, New York, N.Y., a corporation of Delaware No Drawing. Application July 29, 1954
Serial No. 446,676

5 Claims. (Cl. 260—577)

This invention relates to a new process for the manufacture of N-aryl-1,2-alkylenimines. More particularly, this invention relates to a new process for the synthesis of secondary N-aryl-$\beta$-haloalkylamines and the subsequent cyclization to the imine.

The synthesis of N-aryl-$\beta$-haloalkylamine had been attempted in the past (Ber. 70B, 985–6 (1937)), by reacting aniline with ethylene dibromide. The expected product, namely, N-phenyl-$\beta$-bromoethylamine could not be isolated. However, upon treatment with HCl and subsequent distillation a small amount of N-phenyl-$\beta$-chloroethylamine was obtained in an overall yield of the order of about 5 percent. A considerable amount of a by-product N,N-diphenyl piperazine, was produced. Thus, there has been no practical process heretofore for synthesizing N-arylethylenimine type compounds by a combination of the step of forming an N-aryl-$\beta$-haloalkylamine and the cyclization of this compound to the corresponding imine. In the past, the imine in question has been obtained by cyclizing the purified N-aryl-$\beta$-haloalkylamine obtained by devious routes or by treating N-$\beta$-hydroxy ethylamine sulfuric esters with solutions of caustic alkali or alkaline earth hydroxides. The prior art methods thus involve a greater number of steps in the synthesis of the N-aryl alkylenimines, which made the process unsatisfactory economically. It is thus seen that the art would be enhanced by a process which would produce the secondary N-aryl-$\beta$-haloalkylamines and also the N-arylalkylenimines in better yields and by a more efficient method.

It is, therefore, an object of the present invention to provide a novel process for the synthesis of sec-N-aryl-$\beta$-haloalkylamines. It is a further object of the present invention to provide a process, whereby N-arylalkylenimines can be obtained, comprising reacting a vicinal dihaloalkyl compound with a primary aryl amine and then subjecting the product in the reaction mixture to the cyclization step without isolating the intermediate N-aryl-$\beta$-haloalkylamine, wherein the nature of the dihalo compounds and the halogen substituents as well as the type of aryl amines that can be used are described more fully hereinbelow.

The terms, "alkyl" and "alkylene" as used throughout this writing shall be construed to mean hydrocarbon groups which may or may not have other substituents thereon. The term "aryl" shall likewise be construed to mean aromatic groups which may or may not have other substituents thereon.

The first step of our invention consists of a process for obtaining a sec-N-aryl-$\beta$-haloalkylamine wherein the $\beta$-halogen has an atomic weight less than 40, comprising reacting a primary aromatic amine with a vic-dihaloalkyl compound wherein at least one of the vicinal halogens has an atomic weight less than 40. The overall method for the synthesis of an N-aryl alkylenimine compound is obtained by a process comprising reacting a primary aromatic amine with a vic-dihaloalkyl compound, wherein at least one of the vicinal halogens has an atomic weight less than 40, to produce a sec-N-aryl-$\beta$-haloalkylamine in which the $\beta$-halogen has an atomic weight less than 40 and then subjecting the reaction mixture so obtained to a dehydrohalogenating process by adding the mixture to a solution containing a strong base.

The dihalo alkyl compounds that can be used in our invention have the formula

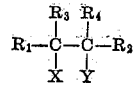

wherein $R_1$, $R_2$, $R_3$ and $R_4$ can be the same or different and can be hydrogen, halogen or alkyl hydrocarbon groups which can be either straight chain, branched chain, alicyclic or substituted alicyclic having from one to about eighteen carbon atoms. X is any one of the halogen atoms and Y is a halogen atom having an atomic weight less than 40. Of the various possible dihalo alkyl compounds that can be employed in the process of our invention, as stated more fully hereinbelow, we especially prefer those in which the R groups are hydrogen or saturated hydrocarbon groups.

We have discovered that when a primary aromatic amine as, for example, aniline, is reacted directly with a vic-dichloro alkyl compound such as 1,2-dichloro ethane, high yields of the secondary N-aryl-$\beta$-chloro alkyl amine are obtained. This is unexpected in view of the fact that when a vic-dibromo alkyl compound such as 1,2-dibromo ethane is reacted with aniline the product is primarily N,N-diphenyl piperazine and not the N-aryl-$\beta$-bromethyl aniline. The vic-difluoro alkyl compound reacts in the same manner as the vic-dichloro alkyl compound with primary aromatic amines to give the sec-N-aryl-$\beta$-fluoro alkyl amine.

We have also unexpectedly discovered that still better results are obtained when a primary aromatic amine is reacted with a vic-dihalo alkyl compound in which the vicinal halogens are not alike. For example, when aniline is reacted with 1-bromo-2-chloro ethane an almost quantitative yield of the sec-N-phenyl-$\beta$-chloroethyl amine is obtained. The reaction has a further advantage in that an alkyl compound possessing vicinal halogens which are not alike can be reacted with a primary aromatic amine at lower temperatures than when the two halogens are alike. In addition, there is practically no contamination of the product since side reactions are to a large degree suppressed. Other combinations of halogens on vicinal dihalo compounds are fluorine and chlorine, fluorine and bromine, fluorine and iodine, and chlorine and iodine. When such combinations are employed, results are comparable to that obtained when the vicinal halogens are chlorine and bromine.

Another embodiment of our invention is to include a tertiary amine in the reaction mixture containing a primary aromatic amine and a vic-dihalo alkyl compound. It was found that when a tertiary amine is included in the reaction mixture, it serves to remove the hydrohalide acid formed in the reaction and thus leaves the aromatic amine free to react with the vicinal dihalo compound. This greatly increases the amount of desired product formed per unit quantity of primary aromatic amine used. Non-limiting examples of such tertiary amines are triethyl amine, tributyl amine, benzyl diethyl amine, pyridine and the like. The requirement is that the tertiary amine have a base strength that is higher than that of the aromatic amine used as one of the reactants in the process.

The secondary N-aryl-$\beta$-haloalkylamines, obtained as described above, can be readily dehydrohalogenated to form the corresponding N-aryl alkylenimine. The cyclization is accomplished by heating the secondary N-aryl-β-haloalkylamine in the presence of a basic reagent. By this method, HCl is eliminated and the N-aryl alkylenimine is formed. It has also been found that while in some cases it may be advisable to isolate the N-aryl-β-haloalkylamine in order to perform the cyclization step on the pure compound, it is often possible and frequently advantageous to subject the reaction mixture obtained on reacting the primary aromatic amine with the vic-dihaloalkyl compound, to the conditions which would bring about the cyclization of the secondary N-aryl-β-haloalkylamine contained in the mixture. That is, the mixture containing the N-aryl-β-haloalkylamine can be directly treated with a basic reagent to produce the required N-aryl alkylenimine which can then be separated from the final reaction mixture by fractional distillation, crystallization or other known means.

A further embodiment of our invention with respect to subjecting a mixture obtained on reacting a primary aromatic amine with a vic-dihalo alkyl compound to the cyclization step, is to first remove the excess vicinal dihalo compound if such an excess is present. While the removal of the excess dihalo compound is not necessary for the successful cyclization of the N-aryl-β-haloalkyl compound to the imine, it does serve to lessen the amount of base required since the base also dehydrohalogenates the dihaloalkyl compound.

The primary aromatic amines that can be used in our process can be mono or poly-nuclear and they may or may not have other substituents on the aromatic ring. Non-limiting examples of such amines are aniline, o-chloroaniline, the various other halogenated anilines such as p-bromoaniline, m-fluoroaniline, p-iodoaniline and the like; naphthyl amine, the various halogenated naphthyl amines; alkoxy substituted aryl amines such as p-methoxy aniline, o-ethoxy aniline, m-butoxy aniline, the various alkoxy naphthyl amines, the various alkoxy anthryl amines; the various alkyl substituted aromatic amines such as p-ethylaniline, o-methyl aniline, m-propyl aniline and the various other ring substituted alkyl anilines, as well as the various ring substituted alkyl naphthyl amines, alkyl anthryl amines and the like. Of the various possible primary aryl amines that can be used, we prefer those having one ring or two condensed rings in the aromatic portion. We especially prefer mono-nuclear aromatic amines such as aniline, o-chloroaniline, p-methylaniline, and the various other ring substituted anilines found suitable as one of the components in carrying out the process of our invention.

The vicinal dihaloalkyl compounds that can be used in the process of our invention can have from two to about 20 carbon atoms and can be either straight chain, branched chain, cyclic or substituted cyclic as, for example, 1,2-dichloroethane, 1-chloro-2-fluoroethane, 1-chloro-2-bromoethane, 1,2-dichloropropane, 2,3-dichloropentane, 1,2-dichloro-isobutane, 1-bromo-2-chlorobutane, 2-chloro-3-iodooctane, 3,4-dichloroheptane, 1,2-dichlorohexane, vicinal dichloro dodecane, vicinal chlorobromo eicosane and the like. In addition, the vic-dihaloalkyl compound may have other chlorines, bromines or iodines thereon, as, for example, 1,1,2-trichloroethane, 1,2-dichloro-bromoethane, 1,1,2-trichloroisobutane, 1,2-dichloro-1-iododecane, 2,2,3-trichlorodecane, 1,1,2-trichlorocyclohexane, 1-bromo-1,2-dichlorocyclohexane, 3,3-dichloro-4-bromoheptane, and the like.

In addition to vic-dihaloalkyl compounds of the type illustrated above, other aliphatic compounds having two halogen atoms on vicinal carbons can be employed in the process of our invention. Non-limiting examples of such compounds are vicinal dihalo alcohols such as 3,4-dichlorobutanol - 1,5-chloro-6-bromohexanol-1,4-methyl-3-chloro-4-iodopentanol-1, and the like. Examples of ethers that can be used are 3,4-dichlorobutyl methyl ether, 2-chloro-3-bromo-propyl ethyl ether, 2-fluoro-3-bromo-5-phenyl pentyl methyl ether, 3-chloro-4-bromo-octyl ethyl ether, 5-chloro-6-bromo-eicocyl methyl ether, 7,8-dichlorooctyl propyl ether and the like. Examples of olefioic compounds that can be used in the process of our invention are 3,4-dichlorobutene-1, 5-chloro-6-bromo-hexene-1, 4-ethyl-6-fluoro-7-bromoheptene-2, 3,3 - dimethyl-4-chloro-5-bromopentene-1, and the like.

Of the various possible vicinal dihalo aliphatic compounds that can be used in the process of our invention we prefer to employ the vicinal dihalo aliphatic compounds. Of the latter, we especially prefer saturated halo aliphatic compounds containing from about 2 to about 12 carbons such as 1,2-dichloroethane, 1-bromo-2-chloroethane, 1-bromo-2-chloropropane, 1-chloro-2-fluorooctane 2,3-dichlorobutane and the like up to and including vic-dihalododecane, although hydrocarbons having a greater number of carbon atoms may also be utilized.

The basic reagents in the presence of which the first step of our reaction can be carried out, are, as indicated hereinabove, compounds which have a greater base strength than the aromatic amine that is used as one of the reagents in the reaction, and yet they must not be so strong as to cause significant dehydrohalogenation of the vicinal dihalo compound that is being employed, at the temperature at which the reaction is being carried out. Compounds that fall within this classification are organic bases such as tertiary amines as, for example, triethylamine, benzyl dimethylamine, N-ethylpiperidine, tributylamine, as well as pyridine and the like. Other bases that can be used will be apparent to one skilled in the art.

Examples of N-aryl-β-haloalkylamines that can be synthesized by the process of this invention are N-phenyl-β - chloroethylamine, N-phenyl-2-chloro-4-hydroxybutyl-amine, N-phenyl-2-chloro - 3 - ethoxypropylamine, N-phenyl-2-chloro-3-methylbutenyl-3-amine, N-(p - tolyl)-β - chloropropylamine, N - (m - tolyl) - β - fluorobutyl-amine, N - (p - tolyl) - 2 - chloro - 4 - methoxybutyl-amine, N - (p- - tolyl) - 2 - chlorobutenyl - 3 - amine, N - (2,4 - dimethylphenyl) - α - methyl - β - chlorobutyl-amine, N - (p - chlorophenyl) - β - chlorocyclohexyl-amine, N - (p - chlorophenyl) - 2 - chloro - cyclohexenyl - 4 - amine, N - (2,4 - dibromophenyl) - α-methyl - β - chloroamylamine, N - (2 - chloro - 4 - ethylphenyl) - β - chlorooctylamine, N - (p - nitrophenyl)-2 - chlorobutylamine, N - (p - dimethylaminophenyl)-β - chlorododecylamine, N - (2 - methyl - 5 - methoxyphenyl) - β - fluoro eicosylamine, N - (p - tert - butoxyphenyl)-β-chloroethylamine and the like.

Non-limiting examples of the N-arylethylenimine compounds are 1-phenyl ethylenimine, 1-phenyl-2(3'-hydroxypropyl)ethylenimine, 1-phenyl-2-methyl ethylenimine, 1-phenyl-2-ethylethylenimine, 1 - phenyl-2-ethenylethylenimine, 1-(o-chlorophenyl)-ethylenimine, 1-(p-bromophenyl)ethylenimine, 1-(p-chlorophenyl)-2(2'-propenyl)-ethylenimine, 1-(p-methoxyphenyl)-ethylenimine, 1-(o-methyl-m-ethoxyphenyl)-2,3-diethylethylenimine, 1-(o-methylphenyl)ethylenimine, 1-(p-methylphenyl)2 - (2' - ethoxyethyl)ethylenimine, 1-(2,6-dimethylphenyl)-2-methylethylenimine, 1-(p-isopropylphenyl) - 2,3 - dimethylethylenimine, 1-(p-aminophenyl)-ethylenimine, 1-(p-nitrophenyl)2-methyl-3-ethylethylenimine, 1 - (p-hydroxyphenyl)-ethylenimine, 1-(m-methylphenyl)-2-cyclohexyl ethylenimine, 1-(p-dimethylaminophenyl)-ethylenimine, 1-(2-chloro-4-methylphenyl)-ethylenimine, 1-naphthyl ethylenimine, 1-naphthyl-2-methyl ethylenimine, 1-anthryl ethylenimine and the like.

In general, the process of our invention is carried out by reacting a primary aromatic amine of the type described hereinabove with an alkyl compound possessing at least two halogen atoms located on vicinal carbons, of the type described previously, to produce secondary N-aryl-β-haloalkylamines in which the halogen has an atomic weight less than 40. An example of this process is illustrated by the reaction between aniline and 1,2-dichloroethane to produce N-(β-chloroethyl)aniline. The process may or may not be carried out in the presence of an amine base of the kind described previously. The reaction is found to proceed satisfactorily at temperatures above about 0° and at pressures of sub-atmospheric, atmospheric or higher. The second step of this process involves treating the N-aryl-β-haloalkylamine with a basic reagent such as aqueous NaOH, alcoholic KOH, sodium ethoxide or other suitable base, to dehydrohalogenate and cyclize to the corresponding imine.

While the reaction can be carried out in two steps, it is often advantageous, as has been stated hereinabove, to take the reaction mixture from the first step and subject it directly to the basic cyclization treatment. Any excess unreacted dihalo compound may be removed prior to the cyclization step if so desired in order to lessen the amount of base required. However, as has been previously stated it is not necessary to remove the unreacted vicinal dihalo compound as good yields of the imine product are obtained in any event.

The invention will be more fully understood by reference to the following set of illustrative examples in which the percent conversion is calculated on the basis of the amount of primary aromatic amine charged to the reaction vessel and the percent yield is calculated on the basis of the amount of primary aromatic amine used up in the reaction. The amine hydrochloride is considered as recoverable amine. The maximum theoretical conversion when a tertiary amine base is not employed, is only 50 percent since one-half of the aniline is precipitated due to the HCl formed in the reaction.

Example I

N(β-chloroethyl)aniline.—A solution of 44 parts of aniline in 204 parts of 1-chloro-2-bromoethane was charged to a vessel equipped with temperature measuring devices and heat control means, means for agitation and open to the atmosphere through a liquid-cooled condenser. The solution was heated to 90° C. and maintained within a temperature range of 80–90° C. and in constant agitation for 2.5 hours. The reaction vessel was then cooled, the reaction mixture removed and the solid aniline hydrobromide (melting point above 240° C.) separated by filtration and washed with ether. The liquid fraction was distilled at reduced pressure and it yielded 25.6 parts of aniline, 14.3 parts (20 percent conversion, 82 percent yield) of N(β-chloroethyl)aniline, which distilled over at a pressure of 1 millimeter at a temperature above 65° C. having a refractive index of 1.5757 $n_D^{20}$, and 2.5 parts of N,N'-diphenylpiperazine. A hydrochloride derivative of the N(β-chloroethyl)aniline product melted at 155–158° C. and gave no depression with a sample of a compound known to be N(β-chloroethyl)aniline hydrochloride.

A carbon, hydrogen and chlorine analysis of a hydrochloride derivative of N(β-chloroethyl)aniline showed 50.3 percent C, 5.67 percent H and 36.4 percent Cl (calculated, 50.0 percent C, 5.73 percent H and 36.9 percent Cl).

In like manner, when aniline is reacted with 1-bromo-2-chloropropane, a good yield of N(β-chloropropyl)aniline is obtained. Likewise, when p-toluidine is reacted with 1-chloro-2-fluorodecane, a good yield of N(β-fluorodecyl)p-toluidine is obtained. When p-chloroaniline is reacted with 2,3-dichlorohexane in the manner described above, a good yield of N(1-methyl-2-chloropentyl)p-chloroaniline is produced. Also, when 2,4-dibromoaniline is reacted with 1-bromo-2-chloro-4-hydroxybutane, the product is N(2-chloro-4-hydroxybutyl)2,4-dibromoaniline which is obtained in good yield. Similarly, when the method of this example is used to react naphthyl amine and 1-chloro-2-fluoropentene-4, there is obtained N(2-fluoro-4-pentenyl)naphthyl amine. Likewise, when anthryl amine is reacted with 1-bromo-2-chloro-4-ethoxybutane, there is obtained a good yield of N(2-chloro-4-ethoxybutyl)anthryl amine. In like manner, p-ethylaniline reacts with 3-bromo-4-chloro eicosane to give a good yield of N(2-ethyl-3-chloro-octadecyl)p-ethylaniline.

Example II

N(β-chloroethyl)aniline.—To the reaction vessel described in Example I there were added 18 parts of aniline, 14 parts of 1-chloro-2-bromoethane and 17 parts of toluene. The mixture was heated to 95° C. and maintained at a temperature range of 90° C. to 95° C. and in constant agitation for a period of four hours. The reaction vessel was then cooled, the contents removed and 5.8 parts of aniline hydrobromide separated by filtration. A good yield of N(β-chloroethyl)aniline was obtained upon treating the filtrate in a manner similar to that used in Example I.

Good results are also obtained when the reaction is carried out in the presence of ethyl alcohol as a solvent. Similarly, when benzene, nitrobenzene and dioxane are used as solvents, good yields of product are obtained.

Example III

N(β-chloroethyl)aniline.—A pressure resistant vessel having a removable cap for charging and discharging liquids and solids, equipped with temperature measuring devices and heat control means, was charged with a solution of 93 parts of aniline and 297 parts of 1,2-dichloroethane. The reaction vessel was closed and heated to 139° C. and maintained at that temperature for 1.5 hours permitting the reaction to proceed at the vapor pressure of the system. The reaction vessel was then cooled, the reaction mixture removed and the solid aniline hydrochloride separated by filtration and washed with ether. The liquid fraction was distilled at reduced pressure and it yielded 40.7 parts of aniline, 25.1 parts (16 percent conversion, 54 percent yield) of N(β-chloroethyl)aniline having a refractive index of 1.5755 $n_D^{20}$, and 14.3 parts of diphenyl ethylene diamine.

A hydrochloride derivative prepared of the N(β-chloroethyl)aniline melted at 155–157° C. (literature, 156–158° C.).

Example IV

N(β-chloroethyl)aniline. — The reaction vessel described in Example III was charged with 46.5 parts of aniline, 297 parts of 1,2-dichloroethane and 39.5 parts of pyridine. The reaction vessel was closed, heated to 139° C. and maintained at that temperature for 1.5 hours at the vapor pressure of the system. The reaction vessel was then cooled and the contents removed. After filtration and an ether wash, the filtrate was distilled to produce 11.7 parts (18.4 percent conversion) of N(β-chloroethyl)aniline. Some diphenyl piperazine was also formed.

Example V

N(β-chloroethyl)aniline.—The reaction of Example III was repeated using triethylamine in place of pyridine as the third component. The reagents charged to the reaction vessel consisted of 46.5 parts of aniline, 297 parts of 1,2-dichloroethane and 50.5 parts of triethylamine. The mixture was heated to 139° C. and maintained at that temperature for 1.5 hours at the vapor pressure of the system. A slight increase in pressure was noted which was probably due to vinyl chloride produced by dehydrohalogenation at this temperature. After cooling, filtering and washing with ether, distillation of the ether extract gave 26.7 parts (34 percent conversion) of N(β-chloroethyl)aniline having a refractive index of 1.5737 $n_D^{20}$.

When p-ethoxy aniline is reacted with 1-bromo-2-chlorobutane in the presence of N-ethyl-piperidine, a good yield of N(2-chlorobutyl)p-ethoxyaniline is obtained. In like manner, a reaction between 2-methyl-4-chloroaniline and 1-iodo-2-chloro-4-hydroxy butane in the presence of tributyl-amine produces a good yield of N(2-chloro-4-hydroxybutyl)2-methyl-4-chloroaniline. Also, when 2,4-dibromo aniline is reacted with 1-bromo-2-fluoropentene-4 in the presence of ethyl-diamyl-amine, a substantial yield of N(2-fluoro-4-pentenyl)2,4-dibromo aniline is obtained. Likewise, the reaction of 2-isopropyl-4-methyl aniline with 1-bromo-2-chloro-4-butoxy hexane in the presence of diethylbenzyl amine as the third component, produces N(2-chloro-4-butoxyhexyl)2-isopropyl-4-methyl aniline.

*Example VI*

N-phenylethylenimine.—Two-hundred and thirty-four parts of N($\beta$-choroethyl)aniline in 560 parts of absolute ethyl alcohol were slowly added to 220 parts of potassium hydroxide dissolved in 710 parts of absolute alcohol at an initial temperature of 93° C. contained in a vessel equipped with means for reflux, heating means, and means for agitation. The N($\beta$-chloroethyl)aniline was added over a period of 90 minutes accompanied by constant agitation. A carbon dioxide free atmosphere was maintained above the reaction mixture during the time of reaction by introducing a slow stream of nitrogen into the vessel above the reactants. As the addition proceeded potassium chloride was formed and settled out while the reflux temperature dropped from 93° C. to 82° C. Reflux was maintained for 30 minutes after completion of the addition. The reaction mixture was cooled slowly, diluted by adding it to 6000 parts of cold water, and then the resulting mixture subjected to ether extraction. The ether layer was dried and the ether removed by distillation under reduced pressure. The remaining liquid was distilled at a pressure of 11 millimeters of mercury to yield 108.4 parts (61 percent conversion) of N-phenylethylenimine having a refractive index of 1.5515 $n_D^{20}$, a corrected boiling point of 190.2° C. at a pressure of 760 millimeters of mercury and a freezing point of −21.5° C. A carbon, hydrogen and nitrogen analyses showed 80.5 percent C, 7.39 percent H and 11.6 percent N (calculated 80.6 percent C, 7.56 percent H and 11.77 percent N).

The N-phenylethylenimine was further characterized by conversion to N(2-bromoethyl)aniline hydrobromide. This was accomplished by reacting N-phenylethylenimine with anhydrous HBr in the presence of an ether solvent. The resulting N($\beta$-bromoethyl)aniline hydrobromide was filtered and recrystallized from alcohol to yield a white solid which melted at 136–138.5° C. (literature, 137–138° C.).

*Example VII*

N-phenylethylenimine.—To 31 parts of NaOH in 100 parts of water at reflux temperatures, contained in a reaction vessel equipped with means for reflux, means for agitation, and heating means, were added 48 parts of N($\beta$-chloroethyl)aniline in the form of the hydrochloride dissolved in 165 parts of water. The addition of the latter was made continuously but slowly over a period of 3 hours so that only a small amount was added at any one time, while maintaining agitation and keeping the reaction mixture at reflux temperature. A carbon dioxide-free atmosphere was maintained above the reaction mixture during the addition and subsequent additional reaction time of 0.25 hour by introducing a slow stream of nitrogen into the vessel above the reactants. The reaction was then cooled, extracted with ether and the ether extract distilled under a pressure of 10 millimeters of mercury to yield 12.3 parts of N-phenylethylenimine (41 percent conversion, 52 percent yield).

*Example VIII*

N($\beta$-chloroethyl)o-chloroaniline.—To the reaction vessel described in Example III there were charged 297 parts of ethylene dichloride and 127 parts of o-choloroaniline. The vessel was closed and heated to 165° C. and kept at that temperature for 2 hours at the vapor pressure of the system. The reaction vessel was then cooled, the o-chloroaniline hydrochloride separated by filtration and the filtrate fractionated by distillation. An amount of N(2-chloro-ethyl)o-chloroaniline was obtained equivalent to about a 10 percent conversion. The N($\beta$-chloroethyl)o-chloroaniline was collected between 81 and 108° C. at 1 millimeter and had a refractive index of 1.5809 $n_D^{20}$. The hydrochloride derivative melted at 141–142° C. with decomposition and an analysis of this salt showed 42.5 percent C, 4.55 percent H and 46.8 percent Cl (calculated, 42.4 percent C, 4.41 percent H and 47.0 percent Cl).

Good results are also obtained when p-nitroaniline is reacted with 2,3-dichlorobutane to give N(1-methyl-2-chloropropyl)p-nitroaniline. In like manner, the reaction between 2,4-dibromoaniline and 1-iodo-2-chloro-dodecane produced N(2-chlorododecyl) 2,4-dibromo aniline. Likewise, 4-bromo-1-naphthylamine reacts with 1-bromo-2-chloro-4-hydroxy butane to produce N(2-chloro-4-hydroxybutyl)4-bromo-1-napthylamine.

*Example IX*

N-($\beta$-chloroethyl)p-toluidine.—A solution of 107 parts of p-toluidine and 297 parts of 1,2-dichloroethane is charged to the reaction vessel described in Example III. The reaction vessel is closed, heated to 130° C. and maintained at that temperature for 1.5 hours at the vapor pressure of the system. The reaction vessel is then cooled and the contents removed. After filtration and an ether wash, the filtrate is distilled to give a good yield of N-($\beta$-chloroethyl)p-toluidine.

*Example X*

1-phenyl-2-methylethylenimine.—The reaction vessel described in Example III is charged with 93 parts of aniline and 339 parts of 1,2-dichloropropane. The reaction vessel is closed, heated to 165–170° C., and maintained at that temperature range for 2 hours at the vapor pressure of the system. The reaction vessel is then cooled and the contents removed. After filtration and ether wash, the filtrate is subjected to 20 millimeters pressure at 50° C. to remove excess 1,2-dichlorpropane and ether. The residual liquid is added to 33 parts of potassium hydroxide dissolved in 158 parts of absolute alcohol at an initial temperature of 93° C. contained in a vessel equipped with means for reflux, heating means, and means for agitation. The length of time for the addition of the residual liquid is 60 minutes and the addition is accompanied by constant agitation. A carbon dioxide-free atmosphere is maintained above the reaction mixture at all times. Reflux is maintained for 30 minutes after completion of the addition. The reaction mixture is cooled, diluted with 1500 parts of cold water and the resulting mixture extracted with ether. The ether extract is dried and distilled at reduced pressure and a good yield of 1-phenyl-2-methylethylenimine is obtained.

When the method of this example is followed using p-toluidine and 1-bromo-2-chloroethane to produce N($\beta$-chloroethyl)p-toluidine and the reaction mixture is then added to alcoholic sodium hydroxide and the solution heated, there is obtained 1-p-tolyl ethylenimine in good yield. In like manner, when 2,4-dichloro aniline is reacted with 1-bromo-2-chloro-4-hydroxy pentane to produce N(2-chloro-4-hydroxy pentyl)2,4-dichloro aniline and the reaction mixture then added to aqueous sodium hydroxide, there is obtained a good yield of 1-(2,4-dichlorophenyl)2 - (2' - hydroxypropyl)ethylenimine. Likewise, when naphthylamine is reacted with 1-chloro-2-fluoro-4-ethoxybutane to produce N(2-fluoro-4-ethoxybutyl)naphthylamine and the mixture then subjected to the cyclization step in alcoholic potassium hydroxide, there is obtained a good yield of 1-naphthyl-2-(2'-ethoxy ethyl)-ethylenimine. Also, when anthryl amine is reacted with 1-bromo-2-chloro-hexene-4 to produce N(2-chloro-4-hexenyl)anthrylamine and the reaction product then treated with alcoholic sodium ethoxide, there is obtained a good yield of 1-anthryl-2-(2'-butenyl)ethylenimine.

The temperature at which the first step of our process can be carried out, namely, the reaction between a primary aromatic amine and a vicinal dihalo compound depends primarily on the reagents used. In general, the reaction can be carried out at a temperature of from about 0° C. to about 300° C. We prefer, however, to carry out this reaction at temperatures of from about 40° C. to about 180° C.

The temperature at which the cyclization step is accomplished in the process of this invention also depends on the compound undergoing the reaction. We have found that this step can be carried out at temperatures of from about 0° C. to about 150° C. We find, however, that good results are obtained when the reaction temperature employed is in the neighborhood of from about 40° C. to about 110° C. which constitutes a preferred embodiment of our invention.

The first step of our process, that is, the reaction between a primary aromatic amine and a vicinal dihalo alkyl compound can be carried out at pressures ranging from below atmospheric to about 10,000 atmospheres. We have found, however, that a high yield of product is obtained when the reaction is conducted at pressures of from about 1 atmosphere to 30 atmospheres. The latter range of pressures at which the reaction is carried out constitutes a preferred embodiment of our invention.

The unreacted aromatic amine, such as aniline, can be separated from the secondary N-aryl-β-haloalkylamine by means known to the art. For example, one method of separation involves fractional distillation at reduced pressures of the order of about 1 millimeter of mercury. Another method is to add only sufficient HCl to precipitate the unreacted aromatic amine as the aromatic amine hydrochloride. Other means of separation will be apparent to one skilled in the art. The aromatic amine can be regenerated from the precipitated amine hydrochloride by known methods such as treatment with an inorganic base as, for example, sodium hydroxide, or basic salt such as carbonates of sodium and the like.

The vicinal dihaloalkyl compounds used in this invention are well known products of commerce and numerous references to methods of preparation can be found in the literature. For example, one of the earlier references relating to a method for preparing 1-bromo-2-chloroethane is found in J. Chem. Soc. 43, 37 (1883).

The process of our invention can be carried out in the absence or presence of various solvents either in one or both of the steps involved. The solvent should be one which is inert to the components under the conditions of the reaction. Ethers, alcohols and hydrocarbons in general are examples of suitable solvent types which may be compatible with the reagents that can be used in practicing our invention. In addition, there are certain solvents which can be used exclusively in either the first or the second step of our process. For example, esters such as ethyl acetate and the like can be used as a solvent in the first step, which is the reaction between a primary aromatic amine and vicinal dihalo compound, when it is the intention to separate the N-aryl-β-halo alkyl amine before subjecting it to the second step. The reason for this is that esters would not be advisable as solvents in the cyclization step since they would be hydrolyzed by the basic reagents used. Water is often one of the solvents used in the cyclization step in which the N-aryl-β-haloalkylamine is converted to the corresponding imine by the use of such basic reagents as aqueous alkali hydroxides and the like which may or may not have other solvents present as, for example, alcohols and alcohol and ether mixtures. Specific examples of solvents that can be used in carrying out the process of our invention include benzene, nitrobenzene, ethyl alcohol, dioxane and the like. Also, one of the reacting components can be employed as a solvent in part or all of the reaction. An example of the latter is 1,2-dichloroethane as illustrated in one of the working examples given above. Still other possible solvents and solvent types will be apparent to one skilled in the art.

In the commercial production of the compounds of our invention, it is particularly attractive to conduct the process in a continuous manner. This can be done by a variety of techniques such as passing the reactants either substantially pure or admixed with an inert carrier through a reaction zone. Any solid products that are formed can be withdrawn by conventional means and the liquid products can be further treated as desired, and distilled to separate the products from unreacted starting materials. The continuous method for the production of the compounds of our invention can be carried out either in a "once through" manner or with recycling of reactants and products. In continuous and batch modifications of our invention the reactants can be diluted with inert gases such as nitrogen, A, Ne, He, $CH_4$ and the like as well as with other gaseous, liquid or ordinarily solid diluents or solvents of the kind described hereinabove.

The compounds that can be made by our process have a variety of uses. For example, the N-aryl alkylenimines can be polymerized to give a variety of new and useful plastic materials. The N-aryl alkylenimines obtained by the process of our invention undergo addition reactions accomplished by ring opening and can, therefore, be used as alkylating reagents. They react with halogen acids and with compounds possessing a sulf-hydryl group. Other uses are as textile fiber modifiers, synthetic resin stabilizers, polymerization accelerators, lubricant oil additives and the like.

We claim:

1. A process for obtaining a sec-N-aryl-β-haloalkylamine, wherein said β-halogen has an atomic weight less than 40, comprising reacting a mononuclear primary aromatic amine with a vicinal dihalo alkyl compound wherein both of the said vicinal halogens have an atomic weight less than 40, said reaction being carried out at a temperature of about 40 to 180° C.

2. A process for obtaining a sec-N-aryl-β-haloalkylamine comprising conducting the reaction of claim 1 in the presence of a tertiary amine acid acceptor having a base strength greater than that of the amine reactant.

3. The process of claim 1 wherein said dihalo alkyl compound is a dihaloethane.

4. The process of claim 1 wherein said dihalo alkyl compound is ethylene dichloride.

5. A process comprising reacting aniline with ethylene dichloride at temperatures in the range of from 90 to 145° C. to produce N-phenyl-β-chloroethylamine.

References Cited in the file of this patent

UNITED STATES PATENTS

| | | |
|---|---|---|
| 1,832,534 | Curme et al. | Nov. 17, 1931 |
| 1,965,463 | Jones | July 3, 1934 |
| 2,051,575 | Ruzicka | Aug. 18, 1936 |
| 2,212,146 | Berchet | Aug. 20, 1940 |
| 2,279,294 | Hardman | Apr. 14, 1942 |
| 2,457,048 | Kyrides et al. | Dec. 21, 1948 |
| 2,573,644 | Kerwin et al. | Oct. 30, 1951 |
| 2,623,880 | Hopff et al. | Dec. 30, 1952 |

OTHER REFERENCES

Hickinbottom: J. Chem. Soc. (London), 992 (1930).
Braun et al.: Ber., vol. 50, pp. 1637–1651 (1917).
Braun et al.: Ber., vol. 51, pp. 273–82 (1918).
Braun et al.: Ber., vol. 52, pp. 1716–24 (1919).
Martus: Hormone, vol. 10, pp. 81–83 (1937), cited in C. A. 32: 510, 511 (1938).